US006431594B1

(12) United States Patent
Swann et al.

(10) Patent No.: US 6,431,594 B1
(45) Date of Patent: Aug. 13, 2002

(54) AIR BAG INFLATOR WITH MECHANISM FOR DEACTIVATION OF SECOND STAGE AND AUTOIGNITION (75) Inventors: Timothy A. Swann, Mesa, AZ (US); Ernst M. Faigle, Dryden; Paul A. Bowers, Ray, both of MI (US); Ivan L. Stonich, Hermosa Beach, CA (US); Brian R. Pitstick, Mesa, AZ (US)

(73) Assignees: TRW Vehicle Safety Systems Inc.; TRW Inc., both of Lyndhurst, OH (US)

( * ) Notice: Subject to any disclaimer, the term of this patent is extended or adjusted under 35 U.S.C. 154(b) by 0 days.

(21) Appl. No.: 09/755,323

(22) Filed: Jan. 5, 2001

(51) Int. Cl.[7] ............................................... B60R 21/32
(52) U.S. Cl. ...................................................... 280/735
(58) Field of Search ......................................... 280/735

(56) References Cited

U.S. PATENT DOCUMENTS

| 2,911,504 | A | | 11/1959 | Cohn | |
| 3,503,814 | A | | 3/1970 | Helms, Jr. et al. | |
| 5,133,257 | A | | 7/1992 | Jonsson | |
| 5,167,426 | A | * | 12/1992 | Mihm et al. ................ | 280/735 |
| 5,366,239 | A | * | 11/1994 | Headley .................... | 280/728.2 |
| 5,621,183 | A | * | 4/1997 | Bailey ..................... | 102/202.14 |
| 5,892,433 | A | * | 4/1999 | Fulda ....................... | 180/282 |
| 5,977,653 | A | * | 11/1999 | Schmid et al. ............. | 180/282 |
| 5,984,350 | A | * | 11/1999 | Hagan et al. .............. | 280/733 |
| 6,234,520 | B1 | * | 5/2001 | Breed et al. .............. | 180/282 |
| 6,250,672 | B1 | * | 6/2001 | Ryan et al. ............... | 180/268 |
| 6,305,708 | B2 | * | 10/2001 | Davis et al. .............. | 280/735 |

FOREIGN PATENT DOCUMENTS

EP            0903487            3/1999

OTHER PUBLICATIONS

Article by D. Lewis, et al. entitled "Digital Micropulstion", Sensors and Actuators A; Physical, vo. 80, No. 2 Elsevier, Mar. 2000, p. 143, 154.

* cited by examiner

Primary Examiner—Anne Marie Boehler
Assistant Examiner—Deanna Draper
(74) Attorney, Agent, or Firm—Tarolli, Sundheim, Covell, Tummino & Szabo L.L.P.

(57) ABSTRACT

An apparatus (10) for inflating an inflatable vehicle occupant protection device (36) comprises a housing (12) and an inflation fluid source (34) in the housing for, when actuated, providing fluid for inflating the protection device. An electrically actuatable initiator (38) is connected with the housing (12) for actuating the inflation fluid source (34). The apparatus (10) also comprises vehicle electric circuitry (37) for actuating the initiator (38) to actuate the inflation fluid source (34) in response to sensing an occupant protection event for which inflation of the protection device (36) is desired. A microelectromechanical system device (MEMS device) (52) in the apparatus is electrically energizable to cause actuation of the inflation fluid source (34). An autoignition mechanism (40) responsive to an event other than an occupant protection event energizes the MEMS device to cause actuation of the inflation fluid source. The MEMS device (52), when energized, generates heat for autoigniting the inflation fluid source (34) or for deactivating a secondary inflation fluid source.

25 Claims, 4 Drawing Sheets

AIR BAG INFLATOR WITH MECHANISM FOR DEACTIVATION OF SECOND STAGE AND AUTOIGNITION

BACKGROUND OF THE INVENTION

1. Technical Field

The present invention relates to an inflator for a vehicle occupant protection device. In particular, the present invention relates to an inflator that includes (a) an autoignition mechanism and/or (b) a mechanism for the deactivation of the second stage of a dual stage air bag inflator.

2. Description of the Prior Art

An inflator for an inflatable vehicle occupant protection device, such as an air bag, includes a source of inflation fluid. Some known inflators include an autoignition device or mechanism. The autoignition device is operable to actuate the inflation fluid source when the temperature of the inflator reaches a predetermined temperature. Such actuation can avoid having the inflator actuated at a higher temperature experienced, for example, in a vehicle fire when the inflator housing has gotten so hot that the housing material has weakened.

Some inflators are of the "dual stage" type and include two separate, independently actuatable inflation fluid sources ("stages"). The two inflation fluid sources can be actuated simultaneously or at different times to tailor the rate and volume of flow of inflation fluid out of the inflator. In some cases, only one of the inflation fluid sources is actuated, for example, when a relatively low fluid flow rate is desired. In these cases, the second inflation fluid source remains active after deployment of the air bag. It may be desirable, for safety reasons, to deactivate the second inflation fluid source when it has not been used to inflate the air bag.

SUMMARY OF THE INVENTION

The present invention is an apparatus for inflating an inflatable vehicle occupant protection device. The apparatus comprises a housing and an inflation fluid source in the housing for, when actuated, providing gas for inflating the protection device. The apparatus also comprises an electrically actuatable initiator connected with the housing for actuating the inflation fluid source. The apparatus further comprises vehicle electric circuitry for actuating the initiator to actuate the inflation fluid source in response to sensing an occupant protection event for which inflation of the protection device is desired. A microelectromechanical system device (MEMS device) in the apparatus is electrically energizable to cause actuation of the inflation fluid source. Means responsive to an event other than an occupant protection event energizes the MEMS device to cause actuation of the inflation fluid source.

In one embodiment, the means responsive to an event other than an occupant protection event comprises means responsive to an increase in temperature in the housing above a predetermined temperature.

In another embodiment, the inflation fluid source comprises a primary inflation fluid source and a secondary inflation fluid source actuatable independently of each other. The means responsive to an event other than an occupant protection event comprises means responsive to sensing of lapse of a predetermined period of time after actuation of only the primary inflation fluid source.

BRIEF DESCRIPTION OF THE DRAWINGS

The foregoing and other features of the present invention will become apparent to one skilled in the art to which the present invention relates upon consideration the following description of the invention with reference to the accompanying drawings, in which.

DESCRIPTION OF EMBODIMENT OF THE INVENTION

Figure 1:
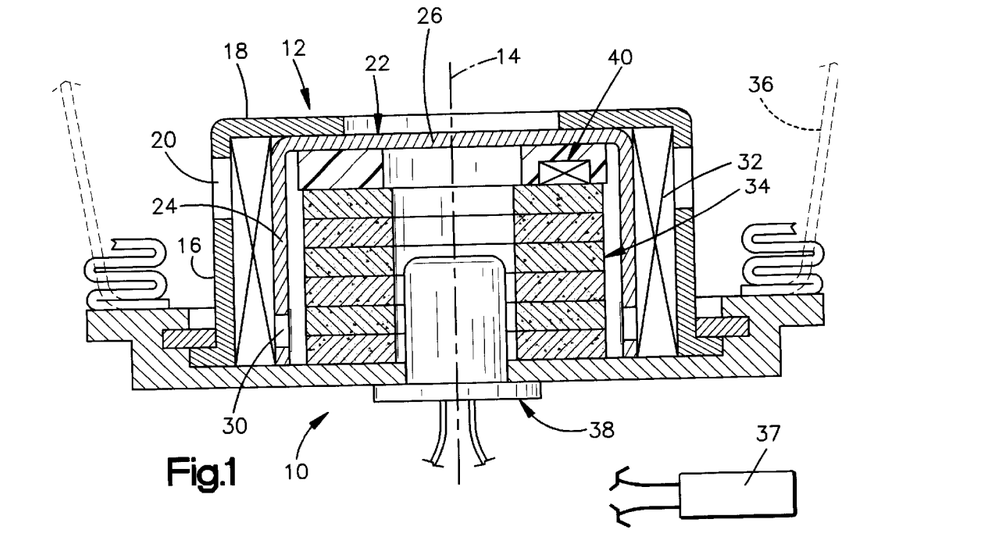
FIG. 1 is a sectional view of an inflator in accordance with a first embodiment of the present invention, including an autoignition mechanism.

The present invention relates to an inflator for a vehicle occupant protection device. In particular, the present invention relates to an inflator that includes (a) an autoignition mechanism and/or (b) a mechanism for the deactivation of the second stage of a dual stage air bag inflator. As representative of the present invention, FIG. 1 illustrates an inflator 10 that includes an autoignition mechanism. The inflator 10 is of the type shown in U.S. Pat. No. 5,366,239 and has a cylindrical housing 12, which is centered on an axis 14. The housing 12 has a cylindrical outer side wall 16 and a circular end wall 18. The outer side wall 16 includes a plurality of gas outlet openings 20 in an array extending circumferentially around the outer side wall.

The housing 12 further includes a combustion cup 22, which is located radially inward of the outer side wall 16. The combustion cup 22 has a cylindrical side wall 24 and a circular upper end wall 26. The upper end wall 26 of the combustion cup 22 is fixed, such as by welding, to the end wall 18 of the housing 12. The side wall 24 of the combustion cup 22 has a plurality of gas flow openings 30 in an array extending circumferentially around the side wall.

The housing 12 contains a filter assembly 32 located in the annular space between the combustion cup 22 and the outer side wall 16. The housing 12 also contains a known, solid ignitable gas generating material 34 within the combustion cup 22. The gas generating material 34 as illustrated is in the form of a plurality of stacked discs. The gas generating material 34 could, however, have any other suitable configuration known in the art.

The inflator 10 is associated with an air bag shown schematically at 36. Vehicle electric circuitry indicated schematically at 37 is operative to actuate an initiator 38 in the event inflation of the air bag 36 is desired to help protect a vehicle occupant. Actuation of the initiator 38 causes the gas generating material 34 to be ignited. When the gas generating material 34 is ignited, it rapidly produces a large volume of inflation fluid in the form of gas. The pressure inside the combustion cup 22 rises rapidly. The inflation fluid flows through the gas flow openings 30 and into the filter assembly 32. The inflation fluid then flows out of the inflator 10, through the gas outlet openings 20, to inflate the air bag 36.

The inflator 10 includes an autoignition mechanism 40. The autoignition mechanism 40, shown schematically in FIG. 2, includes a piezoelectric generator 42, an energy storage device 44, a temperature transducer 46, a controller or microprocessor 48, and a heat source 50 that comprises at least one microelectromechanical system (MEMS) device.

Figure 2:
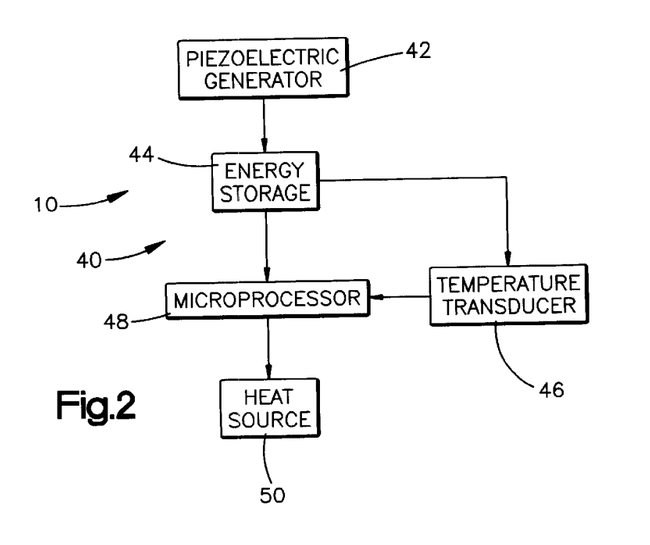
FIG. 2 is a block diagram of the autoignition mechanism of FIG. 1.

The piezoelectric generator 42 employs a piezoelectric crystal to generate electric energy when subjected to mechanical forces, such as vibration. The energy storage device 44 is electrically connected to the piezoelectric generator 42. The energy storage device 44 is operable to store electrical energy generated by the piezoelectric generator 42, and preferably comprises one or more capacitors.

The temperature transducer 46 is electrically connected to the energy storage device 44. The temperature transducer 46 is powered by electrical energy generated by the piezoelectric generator 42 and stored by the energy storage device 44. The temperature transducer 46 is operable to sense the temperature in the inflator housing 12 at the location of the autoignition mechanism 40 and to create an electrical output indicative of the sensed temperature.

The controller 48 is electrically connected to the energy storage device 44. The controller 48 is powered by electrical energy generated by the piezoelectric generator 42 and stored by the energy storage device 44. The controller 48 is connected to the output of the temperature transducer 46 and receives the electrical output, which is indicative of the sensed temperature. (A temperature transducer for the autoignition mechanism 40 may, alternatively, be located elsewhere in the inflator 10 or outside the inflator.)

The controller 48 is electrically connected to the heat source 50, for controlling actuation of the heat source in a manner described below. The controller 48 may be a discrete controller chip or may, preferably, be electric circuitry included with and formed as one piece with other components of the autoignition mechanism 40 as one chip-like device. The controller 48 may be programmed to set a predetermined autoignition temperature of the inflator 10.

Figure 4:
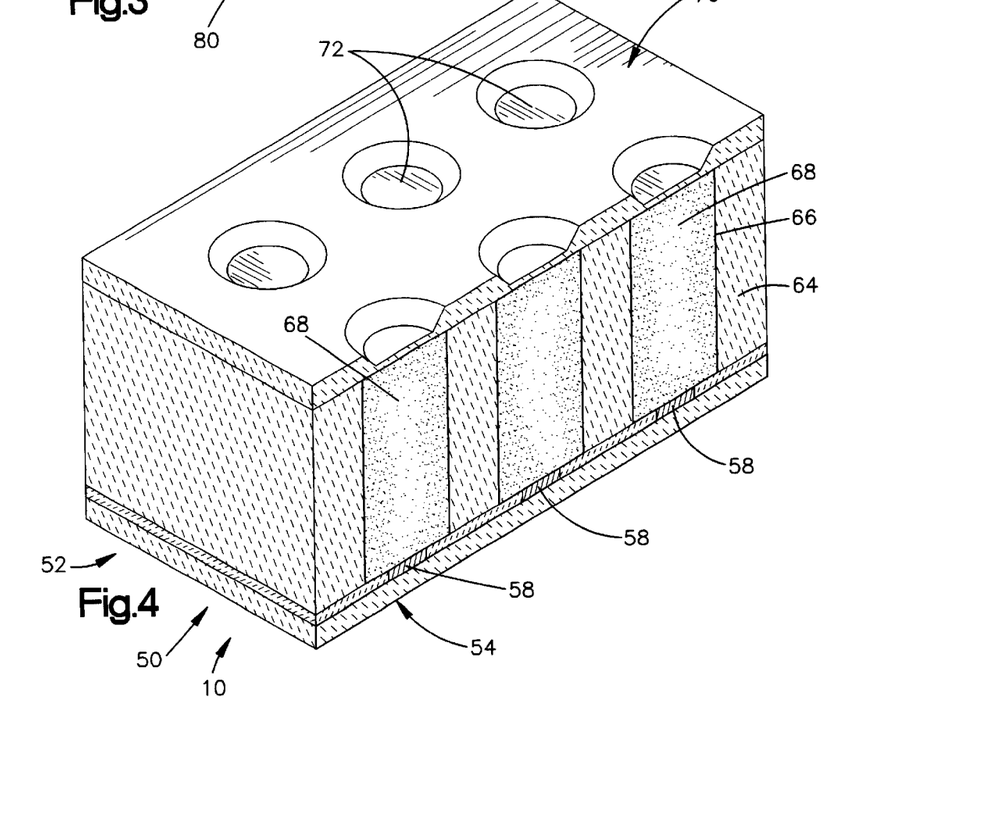
FIG. 4 is a cutaway perspective view of one of the MEMS devices of the array of FIG. 3.
Figures 5, 6, 7:
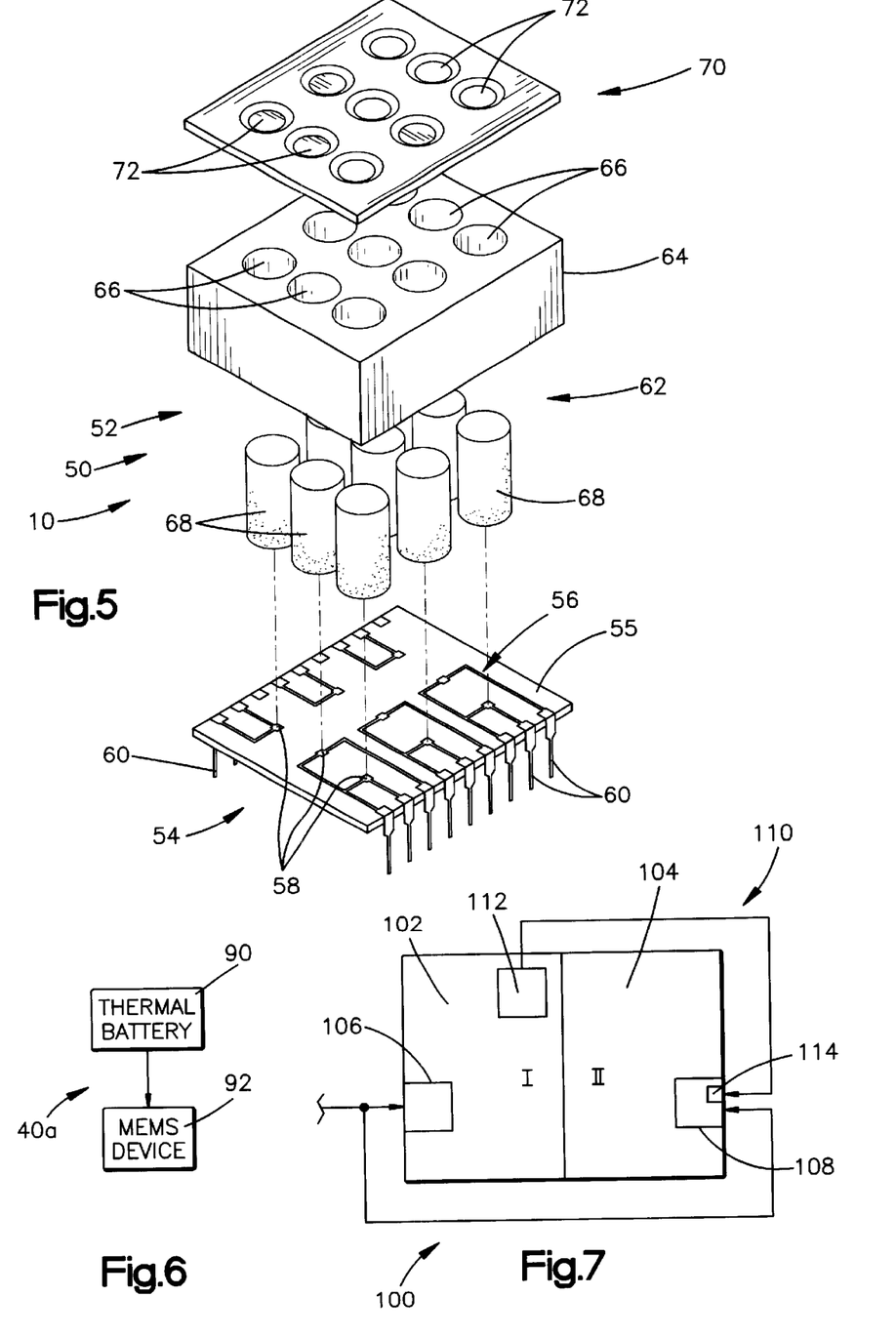
FIG. 5 is an exploded perspective view of the MEMS device of FIG. 4.
FIG. 6 is a schematic block diagram of an autoignition mechanism in accordance with a second embodiment of the invention.
FIG. 7 is a schematic illustration of an inflator in accordance with a third embodiment of the present invention, including a second stage deactivation mechanism.

The heat source 50 (FIGS. 3–5) comprises one or more microelectromechanical system (MEMS) devices 52. In the illustrated embodiment, each one of the MEMS devices 52 is configured as shown in FIGS. 4 and 5. Each one of the MEMS devices 52 is a multi-layered device that may be manufactured in a manner similar to that described in European Patent Application EP 0 903 487 A2, and in the article D. Lewis, et al., "Digital Micropropulsion", Sensors and Actuators A: Physical, Vol. 80, No. 2, Elsevier, March, 2000, p. 143–154.

The base 54 may be made using standard complementary metal oxide semiconductor (CMOS) processes. The base 54 may be made from silicon or other suitable material, such a polyimide or ceramic. The base 54 may be made from a composite layer including silicon or other suitable material. The heating elements 58 may be polysilicon resistors or other micro-resistors. The electric circuitry 56 on the base 54 may include address and control electronics.

The base 54 may be made using standard complementary metal oxide semiconductor (CMOS) processes. The base 32 may be made from silicon or other suitable material, such a polyimide or ceramic. The base 54 may be made from a composite layer including silicon or other suitable material. The heating elements 58 may be polysilicon resistors or other micro-resistors. The electric circuitry 56 on the base 54 may include address and control electronics.

The MEMS device 52 also includes a middle layer 62 formed on the base 54. The middle layer 62 includes a propellant block 64. The propellant block 64 defines a series of cylindrical plenums or propellant chambers 66. In the illustrated embodiment, the propellant block 64 includes nine propellant chambers 66. The nine propellant chambers 66 are spaced apart in the propellant block 64 in the same rectangular 3×3 array as the nine heating elements 58 on the base 54. The heating elements 58 are associated in a one-to-one relationship with the propellant chambers 66 for, when energized, heating the contents of the propellant chambers.

One suitable material for the middle layer 62 is hard anodized aluminum. Another suitable material is Foturan brand photosensitive glass. Foturan is a registered trademark of Schott Glaswerke of Mainz, Germany for its products made of glass or glass ceramic materials. These materials can be used to make very fine structures with tight tolerances and high aspect ratios (hole depth to hole width).

The middle layer 62 of the MEMS device 52 also includes, in each one of the chambers 66, contents that are ignitable by the heating elements. For example, each chamber 66 may contain, or be, a container filled with an ignitable liquid. In the illustrated embodiment, the contents of the chambers 66 are bodies 68 of a solid propellant material, or pyrotechnic material, which is actuatable, or ignitable, upon the application of heat, to generate heat. Each propellant body 68 has a generally cylindrical configuration and substantially fills a respective one of the propellant chambers 66.

One suitable material for the propellant bodies 68 is zirconium potassium perchlorate, which is commonly used in igniters for air bag inflators. Another suitable material is potassium dinitrobenzofuroxan (KDNBF).

The MEMS device 52 also includes a top layer or outer layer 70 having a plurality of individually rupturable segments or diaphragms 72, which serve as burst disks. The diaphragms 72 may be thin-walled portions of the outer layer 70. Nine diaphragms 72 are spaced apart in the flexible outer layer 70 in the same rectangular 3×3 array as the nine propellant chambers 66 and the nine heating elements 58.

The outer layer 70 may be made from a thin layer of metal. The diaphragms 72 may be a thin portions of the metal layer. The outer layer 70 may alternatively be made from aluminum tape or Kapton brand tape. The three layers 54, 62, and 70 may be secured together by a known bonding method, such as with a high performance adhesive tape or an aerospace grade RTV adhesive.

The individual diaphragms 72 of the outer layer 70 are associated in a one-to-one relationship with the individual propellant chambers 66. Each diaphragm 72 closes a respective propellant chamber 66. Each one of the diaphragms 72 is rupturable due to an increase in pressure in its associated chamber 66 to enable flow of combustion products, including heat, out of the associated chamber.

Figure 3:
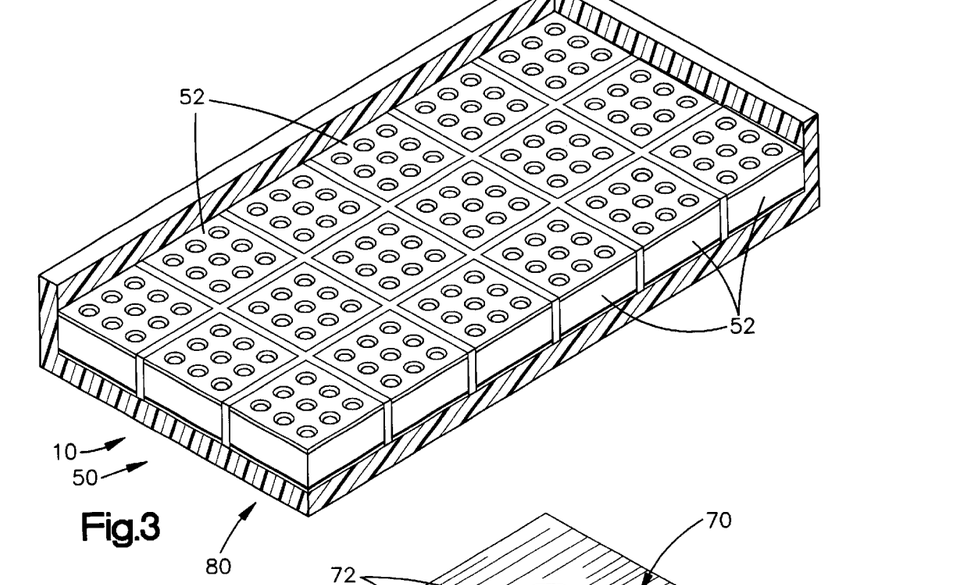
FIG. 3 is a schematic perspective view of a MEMS array that forms part of the autoignition mechanism of FIG. 1.

The individual MEMS devices 52 may be mounted in an array 80, as shown in FIG. 3. The bases 54 of all the MEMS devices 52 are electrically interconnected with each other. Lead wires (not shown) electrically connect the terminal pins 60 in the bases 54 with the controller 48.

In the event of significantly elevated temperature of the inflator 10, such as may occur in a vehicle fire, for example, the temperature transducer 46 provides an output signal indicative of the elevated temperature. The controller 48 is programmed to send an actuation signal to the heat source 50 if the temperature sensed by the temperature transducer 46 is at or above a predetermined temperature.

The actuation signal sent by the controller 48 is received by the heat source 50. The MEMS devices 52 in the heat source 50 are actuated. When an individual heating element 58 of one of the MEMS devices 52 is energized, the heating element generates heat, which is transmitted into the associated propellant body 68. The propellant body 68 ignites and generates combustion products including heat and hot gases.

The increased pressure in the propellant chamber 66 causes the associated diaphragm 72 of the top layer 70 to rupture. The combustion products of all the MEMS devices 52 are directed against the gas generating material 34. The MEMS devices 52 generate sufficient heat to cause ignition of the gas generating material 34.

The autoignition mechanism 40 may, alternatively, be located on or adjacent to the initiator 38 of the inflator 10. In that case, actuation of the heat source 50 results in actuation of the initiator 38 and, thereby, ignition of the gas generating material 34.

In the microthruster application described in European Patent Application EP 0 903 487 A2, each plenum or propellant chamber is about 1.5 mm tall (axial length) and up to about 0.7 mm in diameter. When MEMS devices of this type serve as a heat source for an autoignition mechanism, the depth of each plenum chamber can be readily increased by a factor of at least two or three, and the diameter of each plenum chamber can be readily increased by at least a factor of two. For example, each plenum or propellant chamber may have a diameter in the range of from about 0.5 mm to about 2 mm or more, and a height in the range of from about 1 mm to about 10 mm or more.

Increasing both the diameter and depth of a plenum chamber by those factors can increase the volume of the plenum chamber by a factor of 12. A MEMS device 52 for use in the autoignition mechanism 40 and having an array comprising three to fifteen plenum chambers may have a size in the range of about one-quarter inch square to one inch square.

FIG. 6 illustrates schematically an autoignition mechanism 40a in accordance with a second embodiment of the invention. The autoignition mechanism 40a is usable in the inflator 10 (FIG. 1) in place of the autoignition mechanism 40.

The autoignition mechanism 40a (FIG. 6) includes a thermal battery 90 and a microelectromechanical system (MEMS) device 92. The thermal battery 90 may be of the type described in U.S. Pat. No. 5,167,426, which becomes electrochemically active when the ambient temperature reaches a temperature in a predetermined range of from about 300 degrees F. to about 400 degrees F. When active, the thermal battery 90 enables current to flow between its two opposite poles. The battery 90 generates an output voltage sufficient to actuate the MEMS device 92.

The MEMS device 92 is of the type that generates heat when actuated. Thus, the MEMS device 92 may be of the type shown in FIGS. 1–5, including an ignitable pyrotechnic material.

The autoignition mechanism 40a is located in the inflator 10 adjacent the gas generating material 34. Therefore, when the ambient temperature at the autoignition mechanism 40a equals or exceeds a predetermined temperature, the thermal battery 90 becomes active. The battery 90 generates an output voltage, which causes actuation of the MEMS device 92. The MEMS device 92, when actuated, generates combustion products including heat. The heat causes actuation of the gas generating material 34, in a manner as described above with reference to the first embodiment of the invention.

FIG. 7 illustrates an inflator 100 in accordance with a third embodiment of the present invention. The inflator 100 uses a MEMS device to effect deactivation of a secondary stage of the inflator.

Specifically, the inflator 100 includes first and second stages or inflation fluid sources 102 and 104. Each one of the inflation fluid sources 102 and 104 is of a known type and may comprise a quantity of ignitable gas-generating material, a combustible mixture of gases, or a quantity of stored gas together with non-gaseous pyrotechnic material for heating the stored gas.

The inflator 100 also includes a first initiator 106 associated with the first inflation fluid source 102 and a second initiator 108 associated with the second inflation fluid source 104. The first initiator 106 is electrically actuatable by an actuation signal to actuate the first inflation fluid source 102. The second initiator 108 is electrically actuatable by an actuation signal to actuate the second inflation fluid source 104. The first and second initiators 106 and 108 are electrically separate and are independently actuatable. As a result, the first second inflation fluid sources 102 and 104 are independently actuatable.

The inflator 100 includes a mechanism 110 for deactivating the second inflation fluid source 104 when desired, as described below. The deactivation mechanism 110 includes a thermal battery 112 of the type described above with reference to FIG. 6. The thermal battery 112 becomes electrochemically active when the ambient temperature reaches a predetermined range of from about 300 degrees F. to about 400 degrees F. When active, the thermal battery 112 enables current to flow between its two opposite poles. The thermal battery 112 is located in thermal contact with the first inflation fluid source 102.

The deactivation mechanism 110 also includes a heat source 114. The heat source 114 includes one or more MEMS devices of the type described above with reference to FIGS. 1–5. The heat source 114 is located in thermal contact with the second initiator 108. The MEMS devices in the heat source 114 are electrically connected with the thermal battery 112 and are electrically actuatable by the output of the battery.

In the event of a deployment crash condition involving sudden vehicle deceleration, or other event for which protection of a vehicle occupant may be desired, vehicle electric circuitry including a controller or microprocessor determines whether or not to actuate the first inflation fluid source 102 and the second inflation fluid source 104. If both the first inflation fluid source 102 and the second inflation fluid source 104 are actuated, the entire inflator 100 is no longer active. If, however, only the first inflation fluid source 102 is actuated, the second initiator 108 and the second inflation fluid source 104 remain active. It may then be desirable for safety reasons to deactivate the second initiator 108 and the second inflation fluid source 104. Such deactivation is effected with the deactivation mechanism 110.

Specifically, when the first inflation fluid source 102 is actuated, the ambient temperature at the first inflation fluid source equals or exceeds the predetermined temperature at which the thermal battery 112 is electrochemically activated.

The battery 112 generates an output voltage sufficient to actuate the MEMS devices in the heat source 114. The heat source 114, when actuated, ignites the ignitable material in the second initiator 108. The second initiator 108 causes actuation of the second inflation fluid source 104, as desired.

Figure 8:
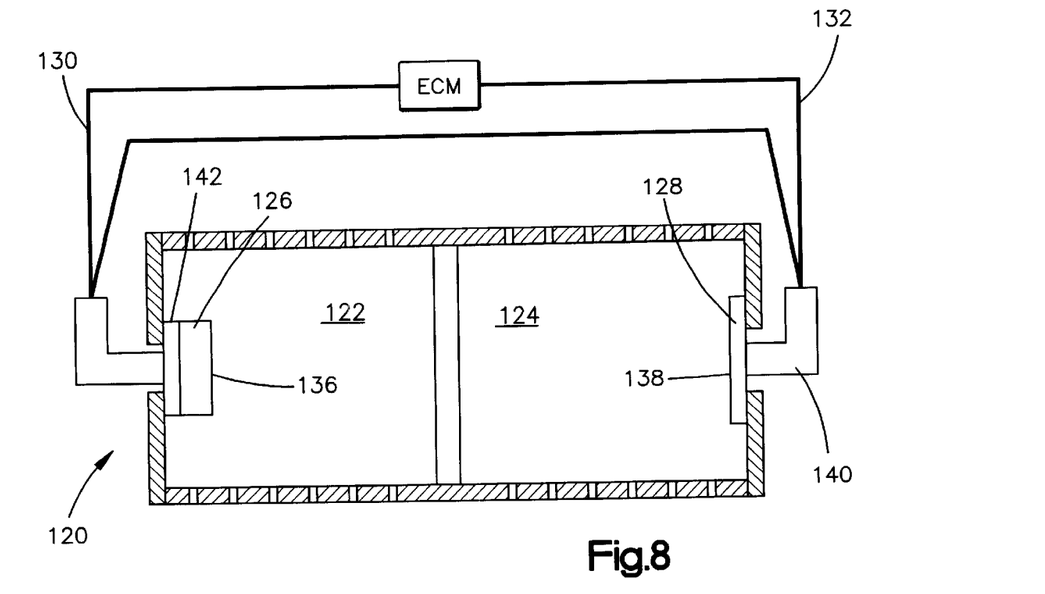
FIG. 8 is a schematic illustration of an inflator in accordance with a fourth embodiment of the present invention, including a second stage deactivation mechanism.

FIG. 8 illustrates an inflator 120 in accordance with a fourth embodiment of the present invention. The inflator 120 includes primary and secondary stages or inflation fluid sources 122 and 124. Each one of the inflation fluid sources 122 and 124 is of a known type and may comprise a quantity of ignitable gas-generating material, a quantity of stored gas under pressure, a combustible mixture of gases, or a quantity of stored gas together with non-gaseous pyrotechnic material for heating the stored gas.

The inflator 120 also includes a primary initiator 126 associated with the primary inflation fluid source 122 and a secondary initiator 128 associated with the secondary inflation fluid source 124. The primary initiator 126 is electrically actuatable by an actuation signal over a lead wire 130 to actuate the primary inflation fluid source 122. The secondary initiator 128 is electrically actuatable by an actuation signal over a lead wire 132 to actuate the secondary inflation fluid source 124. The primary and secondary initiators 126 and 128 are electrically separate and are independently actuatable. As a result, the primary and secondary inflation fluid sources 126 and 124 are independently actuatable.

The primary initiator 126 comprises an array 136 of MEMS devices, such as the array 80 (FIG. 3). The array 136 includes a plurality of individually actuatable MEMS devices. The secondary initiator 128 comprises a similar array 138 of MEMS devices. The array 138 includes a plurality of individually actuatable MEMS devices.

The inflator 120 also includes deactivation control circuitry (control logic) 140. The control circuitry 140 is operative to sense, or determine, which ones of the MEMS devices of the primary and secondary arrays 136 and 138 are still "live", that is, unactuated. The control circuitry 140 is also operative to actuate any live MEMS devices of the primary and secondary arrays 136 and 138 with a predetermined time delay after firing of the inflator 120.

The control circuitry 140 may be contained in an electrical connector for one of the primary and secondary initiators 126 and 128 (in the illustrated embodiment, the secondary initiator). The control circuitry 140 may, alternatively, be contained in a module located on the inflator 120.

The inflator 120 includes an independent power source 142, such as the piezoelectric generator and the energy storage device of FIG. 2, for providing power for the control circuitry 140 and the primary and secondary initiators 126 and 128. The power source 142 is located in the primary stage 122 so that the piezoelectric generator is operative to provide power for deactivation of the secondary stage 124 of the inflator 120.

When the inflator 120 is actuated and only the primary inflation fluid source 122 is actuated, the MEMS devices in the secondary array 138 remain unactuated. In addition, selected ones of the MEMS devices in the primary array 136 may remain unactuated.

The control circuitry 140 determines which MEMS devices in the arrays 136 and 138 remain unactuated. After a predetermined time period, the control circuitry sends an actuating signal to the unactuated MEMS devices in the arrays 136 and 138. All the remaining unactuated MEMS devices in the arrays 136 and 138 are actuated, and the secondary inflation fluid source 124 is actuated (deactivated) as desired. The vehicle's electronic control module is not needed to effect this secondary stage deactivation.

Figure 9:
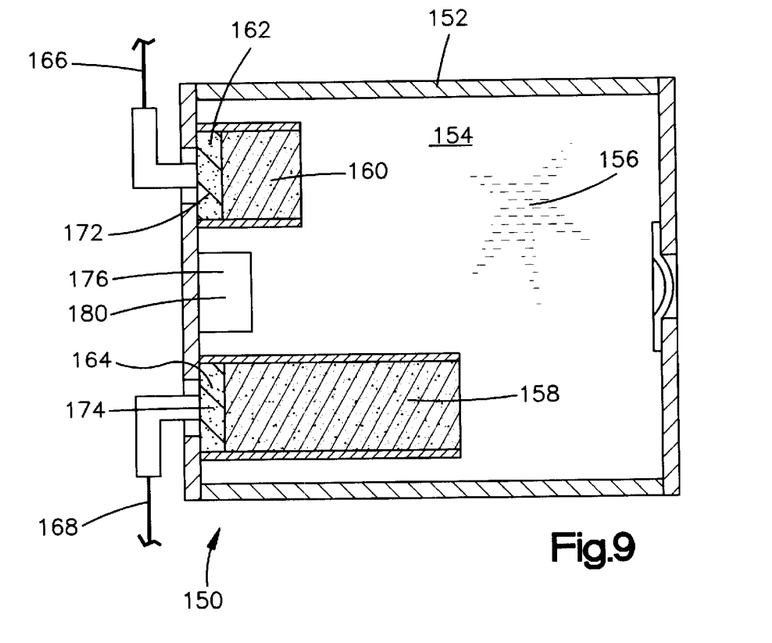
FIG. 9 is a schematic illustration of an inflator in accordance with a fifth embodiment of the present invention, including a second stage deactivation mechanism.

FIG. 9 illustrates an inflator 150 in accordance with a fifth embodiment of the present invention. The inflator 150 is a variable output hybrid inflator. The inflator 150 includes a housing 152 defining a 154. The chamber 154 contains a quantity of stored gas 156 under pressure, together with two separately actuatable bodies 158 and 160 of pyrotechnic material for heating and pressurizing the stored gas.

The inflator 150 includes a first initiator 162 associated with the first body of pyrotechnic material 160 and a second initiator 164 associated with the second body of pyrotechnic material 158. The first initiator 162 is electrically actuatable by an actuation signal over lead wires 166 to ignite the first body of pyrotechnic material 160. The second initiator 162 is electrically actuatable by an actuation signal over lead wires 168 to ignite the second body of pyrotechnic material 158. The first and second initiators 162 and 164 are electrically separate and are independently actuatable. As a result, the first and second bodies of pyrotechnic material 160 and 158 are independently actuatable to control the output of the inflator 150.

The first and second initiators 162 and 164 comprise arrays 172 and 174, respectively, of MEMS devices. Each array 172 and 174 includes a plurality of individually actuatable, heat generating MEMS devices.

The inflator 150 also includes deactivation control circuitry (control logic) 176. The control circuitry 176 is operative to sense, or determine, which ones of the MEMS devices of the first and second arrays 172 and 174 are still "live" (that is, unactuated). The control circuitry 176 is also operative to actuate any live MEMS devices of the first and second arrays 172 and 174 with a predetermined time delay after actuation of the inflator 150.

The inflator 150 also includes an independent power source 180, such as the piezoelectric generator and the energy storage device of FIG. 2, for providing power for the control circuitry 176 and the first and second initiator arrays 172 and 174. The power source 180 is located in the chamber 154 of the inflator 150 so that the piezoelectric generator, in response to the fluid pressure in the chamber, provides power for deactivation of the inflator as needed. FIG. 9 illustrates schematically the power source 180 as being made or assembled with the control logic 176.

When the inflator 150 is actuated and only the first body of pyrotechnic material 160 is ignited, the MEMS devices in the second array 174 remain unactuated. In addition, selected one of the MEMS devices in the first array 172 may remain unactuated.

The control circuitry 176 determines which MEMS devices in the first array 172 remain unactuated. After a predetermined time period, the control circuitry 176 sends an actuating signal to the unactuated MEMS devices in the first array 172, and to the MEMS devices in the second array 174. All the remaining (unactuated) MEMS devices in the arrays 172 and 174 are actuated, and the second body of pyrotechnic material 158 is ignited (deactivated) as desired. The vehicle's electronic control module is not needed to effect this second stage deactivation The MEMS heating element may, alternatively, be a reactive bridge. A reactive bridge is a wire form bridge of bimetallic construction that yields thermal energy when energized electrically, principally by the release of alloy or intermetallic heat of formation from the chemically reacted metals. Reactive bridges are shown in U.S. Pat. Nos. 2,911,504 and 3,503,814, and are available commercially from Sigmund Cohn Corp., 121 South Columbus Avenue, mount Vernon, N.Y., Internet site www.sigmundcohn.com, under the brand name PYROFUZE®. When the two metallic elements of the reactive bridge are brought to the initiating temperature by flow of electric current, they alloy rapidly resulting in instant deflagration without support of oxygen.

One advantage of using a reactive bridge is that it generates and disperses so much heat that it need only be close to (and not in intimate contact with) the material that it is to ignite (such as solid propellant). A resistive heating element, on the other hand, must be maintained in intimate contact with the material being ignited. The reactive bridge can be deposited on the MEMS base layer by a number of different methods.

From the above description of the invention, those skilled in the art will perceive improvements, changes and modifications in the invention. Such improvements, changes and modifications within the skill of the art are intended to be covered by the appended claims.

Having described the invention, we claim:

1. An apparatus for inflating an inflatable vehicle occupant protection device, said apparatus comprising:
   a housing;
   an inflation fluid source in said housing for, when actuated, providing inflation fluid for inflating the protection device;
   an electrically actuatable initiator connected with said housing for actuating said inflation fluid source;
   vehicle electric circuitry including an electronic controller for actuating said initiator to actuate said inflation fluid source in response to sensing an occupant protection event for which inflation of the protection device is desired;
   a microelectromechanical system device (MEMS device) electrically energizable to cause actuation of said inflation fluid source; and
   means responsive to an event other than an occupant protection event for energizing said MEMS device to cause actuation of said inflation fluid source.

2. An apparatus as set forth in claim 1 wherein said means responsive to an event other than an occupant protection event comprises means responsive to an increase in temperature in said housing above a predetermined temperature.

3. An apparatus as set forth in claim 2 wherein said means responsive to an increase in temperature comprises a thermal battery operative to generate electric current for energizing said MEMS device.

4. An inflator for an inflatable vehicle occupant protection device, said inflator comprising:
   a housing;
   an inflation fluid source in said housing for, when actuated, providing fluid for inflating the protection device;
   an electrically actuatable initiator connected with said housing for, when actuated, actuating said inflation fluid source; and
   an autoignition assembly actuatable in response to an increase in temperature in said housing above a predetermined temperature to cause actuation of said inflation fluid source, said autoignition assembly comprising an electrically energizable microelectromechanical system device (MEMS device);
   wherein said MEMS device is electrically energizable to produce combustion products including heat for actuating said inflation fluid source.

5. An apparatus as set forth in claim 4 wherein said autoignition assembly comprises a thermal battery operative to generate electric current for energizing said MEMS device.

6. An apparatus as set forth in claim 4 wherein said MEMS device comprises an electrically energizable heating element and a material ignitable by heat from said heating element to produce combustion products including heat for actuating said inflation fluid source.

7. An inflator for an inflatable vehicle occupant protection device, said inflator comprising:
   a primary inflation fluid source and a secondary inflation fluid source actuatable independently of each other;
   vehicle electric circuitry for (i) sensing an occupant protection event for which inflation of the protection device by only said primary inflation fluid source is desired and (ii) actuating said primary inflation fluid source to inflate the protection device without actuating said secondary inflation fluid source; and
   a microelectromechanical system device (MEMS device) electrically energizable to actuate said secondary inflation fluid source a predetermined period of time after actuation of said primary inflation fluid source in response to sensing of said occupant protection event;
   wherein said MEMS device is electrically energizable to produce combustion products including heat for actuating said secondary inflation fluid source.

8. An inflator as set forth in claim 7 wherein said MEMS device is electrically energizable in response to sensing a temperature in said inflator above a predetermined temperature.

9. An inflator as set forth in claim 8 wherein said primary inflation fluid source when actuated generates heat, and wherein said MEMS device is electrically energizable in response to sensing the heat of actuation of said primary inflation fluid source.

10. An apparatus as set forth in claim 7 wherein said MEMS device has a size in the range of from about one-quarter inch square to about one inch square and includes an array of at least three plenum chambers.

11. An apparatus as set forth in claim 7 wherein said MEMS device comprises:
    an outer layer having a plurality of individually rupturable segments;
    a middle layer having a plurality of individual chambers associated in a one-to-one relationship with said rupturable segments of said outer layer and being closed by said rupturable segments, each one of said chambers having contents heatable to increase the pressure in said one chamber; and
    a base layer having a plurality of individually energizable electric heating elements associated in a one-to-one relationship with said chambers for, when energized, heating the contents of said chambers;
    each one of said rupturable segments being rupturable due to an increase in pressure in its associated chamber to enable flow of combustion products including heat out of said chamber.

12. An apparatus as set forth in claim 11 wherein each one of said plurality of chambers is in the range of from about 0.5 mm to about 2 mm in diameter and in the range of from about 1 mm to about 6 mm in height.

13. An apparatus for inflating an inflatable vehicle occupant protection device, said apparatus comprising:
    a housing;
    an inflation fluid source in said housing for, when actuated, providing inflation fluid for inflating the protection device;
    an electrically actuatable initiator connected with said housing for actuating said inflation fluid source;

vehicle electric circuitry for actuating said initiator to actuate said inflation fluid source in response to sensing an occupant protection event for which inflation of the protection device is desired;

a microelectromechanical system device (MEMS device) electrically energizable to cause actuation of said inflation fluid source; and means responsive to an event other than an occupant protection event for energizing said MEMS device to cause actuation of said inflation fluid source;

wherein said means responsive to an event other than an occupant protection event comprises means responsive to an increase in temperature in said housing above a predetermined temperature;

wherein said means responsive to an increase in temperature comprises a temperature transducer adjacent said inflation fluid source for sensing ambient temperature and for generating an electrical signal indicative of the ambient temperature.

14. An apparatus for inflating an inflatable vehicle occupant protection device, said apparatus comprising:

a housing;

an inflation fluid source in said housing for, when actuated, providing inflation fluid for inflating the protection device;

an electrically actuatable initiator connected with said housing for actuating said inflation fluid source;

vehicle electric circuitry for actuating said initiator to actuate said inflation fluid source in response to sensing an occupant protection event for which inflation of the protection device is desired;

a microelectromechanical system device (MEMS device) electrically energizable to cause actuation of said inflation fluid source; and means responsive to an event other than an occupant protection event for energizing said MEMS device to cause actuation of said inflation fluid source;

wherein said MEMS device is electrically energizable in response to an increase in ambient temperature to produce combustion products including heat for actuating said inflation fluid source.

15. An apparatus as set forth in claim 14 wherein said MEMS device comprises an electrically energizable heating element and a material ignitable by heat from said heating element to produce combustion products including heat for igniting said solid material.

16. An apparatus for inflating an inflatable vehicle occupant protection device, said apparatus comprising:

a housing;

an inflation fluid source in said housing for, when actuated, providing inflation fluid for inflating the protection device;

an electrically actuatable initiator connected with said housing for actuating said inflation fluid source;

vehicle electric circuitry for actuating said initiator to actuate said inflation fluid source in response to sensing an occupant protection event for which inflation of the protection device is desired;

a microelectromechanical system device (MEMS device) electrically energizable to cause actuation of said inflation fluid source; and means responsive to an event other than an occupant protection event for energizing said MEMS device to cause actuation of said inflation fluid source;

wherein said inflation fluid source comprises a primary inflation fluid source and a secondary inflation fluid source actuatable independently of each other; and said means responsive to an event other than an occupant protection event comprises second means for actuating said secondary inflation fluid source after actuation of only said primary inflation fluid source, said second means including said MEMS device.

17. An apparatus as set forth in claim 16 wherein said means for actuating said secondary inflation fluid source after actuation of only said primary inflation fluid source comprises a thermal battery for generating an electric current for energizing said MEMS device.

18. An apparatus as set forth in claim 16 comprising primary and secondary initiators for actuating said primary and secondary inflation fluid sources, each one of said primary and secondary initiators comprising a plurality of MEMS devices, and further comprising electric circuitry for actuating any of said MEMS devices that remain unactuated after actuation of said primary inflation fluid source.

19. An inflator for an inflatable vehicle occupant protection device, said inflator comprising:

a housing;

an inflation fluid source in said housing for, when actuated, providing fluid for inflating the protection device;

an electrically actuatable initiator connected with said housing for, when actuated, actuating said inflation fluid source; and an autoignition assembly actuatable in response to an increase in temperature in said housing above a predetermined temperature to cause actuation of said inflation fluid source, said autoignition assembly comprising an electrically energizable microelectromechanical system device (MEMS device);

wherein said autoignition assembly comprises a temperature transducer adjacent said inflation fluid source for sensing ambient temperature and for generating an electrical signal indicative of the ambient temperature.

20. An inflator as set forth in claim 19 wherein said autoignition assembly comprises control circuitry programmable to set the predetermined autoignition temperature.

21. An inflator for an inflatable vehicle occupant protection device, said inflator comprising:

a housing;

an inflation fluid source in said housing for, when actuated, providing fluid for inflating the protection device;

an electrically actuatable initiator connected with said housing for, when actuated, actuating said inflation fluid source; and an autoignition assembly actuatable in response to an increase in temperature in said housing above a predetermined temperature to cause actuation of said inflation fluid source, said autoignition assembly comprising an electrically energizable microelectromechanical system device (MEMS device);

wherein said MEMS device has a size in the range of from about one-quarter inch square to about one inch square land includes an array of at least three plenum chambers.

22. An inflator for an inflatable vehicle occupant protection device, said inflator comprising:

a housing;

an inflation fluid source in said housing for, when actuated, providing fluid for inflating the protection device;

an electrically actuatable initiator connected with said housing for, when actuated, actuating said inflation fluid source; and an autoignition assembly actuatable in response to an increase in temperature in said housing above a predetermined temperature to cause actuation of said inflation fluid source, said autoignition assembly comprising an electrically energizable microelectromechanical system device (MEMS device);

wherein said MEMS device comprises:

an outer layer having a plurality of individually rupturable segments;

a middle layer having a plurality of individual chambers associated in a one-to-one relationship with said rupturable segments of said outer layer and being closed by said rupturable segments, each one of said chambers having contents heatable to increase the pressure in said one chamber; and a base layer having a plurality of individually energizable electric heating elements associated in a one-to-one relationship with said chambers for, when energized, heating the contents of said chambers;

each one of said rupturable segments being rupturable due to an increase in pressure in its associated chamber to enable flow of combustion products including heat out of said chamber.

23. An apparatus as set forth in claim 22 wherein each one of said plurality of chambers is in the range of from about 0.5 mm to about 2 mm in diameter and in the range of from about 1 mm to about 6 mm in height.

24. An apparatus as set forth in claim 22 wherein said electric heating elements are resistors made using a complementary metal oxide semiconductor (CMOS) process.

25. An inflator for an inflatable vehicle occupant protection device, said inflator comprising:

a primary inflation fluid source and a secondary inflation fluid source actuatable independently of each other;

vehicle electric circuitry for (i) sensing an occupant protection event for which inflation of the protection device by only said primary inflation fluid source is desired and (ii) actuating said primary inflation fluid source to inflate the protection device without actuating said secondary inflation fluid source; and a microelectromechanical system device (MEMS device) electrically energizable to actuate said secondary inflation fluid source a predetermined period of time after actuation of said primary inflation fluid source in response to sensing of said occupant protection event;

wherein said MEMS device is electrically energizable by vehicle electric circuitry at a predetermined time after actuation of said primary inflation fluid source upon sensing of said occupant protection event.

* * * * *